(12) United States Patent
Huang et al.

(10) Patent No.: US 12,429,280 B2
(45) Date of Patent: Sep. 30, 2025

(54) METHOD AND DEVICE FOR MANUFACTURING LIQUID HYDROGEN BY OFFSHORE OFF-GRID SUPERCONDUCTING WIND TURBINE

(71) Applicant: Hunan University, Changsha (CN)

(72) Inventors: Sheng Huang, Changsha (CN); Yujia Zhai, Changsha (CN); Shoudao Huang, Changsha (CN); Chang Yan, Changsha (CN); Wu Liao, Changsha (CN); Ji Zhang, Changsha (CN); Juan Wei, Changsha (CN); Yinpeng Qu, Changsha (CN)

(73) Assignee: Hunan University, Changsha (CN)

( * ) Notice: Subject to any disclaimer, the term of this patent is extended or adjusted under 35 U.S.C. 154(b) by 332 days.

(21) Appl. No.: 18/112,729

(22) Filed: Feb. 22, 2023

(65) Prior Publication Data
US 2023/0341180 A1 Oct. 26, 2023

(30) Foreign Application Priority Data
Apr. 22, 2022 (CN) .............................. 202210428868

(51) Int. Cl.
*F25J 1/00* (2006.01)
*F25J 1/02* (2006.01)
*H02J 9/04* (2006.01)

(52) U.S. Cl.
CPC .............. *F25J 1/0278* (2013.01); *F25J 1/001* (2013.01); *F25J 1/004* (2013.01); *F25J 1/005* (2013.01);
(Continued)

(58) Field of Classification Search
CPC .. F25J 1/001; F25J 1/0278; F25J 1/004; F25J 1/005; F25J 1/0065; F25J 1/0208; F25J 2260/30
See application file for complete search history.

(56) References Cited

U.S. PATENT DOCUMENTS

| | | | | |
|---|---|---|---|---|
| 4,765,813 A | * | 8/1988 | Gaumer, Jr. | ........... F25J 1/0221 62/912 |
| 6,427,483 B1 | * | 8/2002 | Rashad | .................. F25J 1/0097 62/613 |

(Continued)

FOREIGN PATENT DOCUMENTS

| | | | |
|---|---|---|---|
| CN | 101330227 A | | 12/2008 |
| CN | 101704560 A | * | 5/2010 |

(Continued)

OTHER PUBLICATIONS

Guanwen et al., "New technical progress and engineering application," National Defense Industry Press, 10 pages, Aug. 2013.

(Continued)

*Primary Examiner* — Brian M King
(74) *Attorney, Agent, or Firm* — Nields, Lemack & Frame, LLC (57) ABSTRACT

Disclosed are a method and a device for manufacturing liquid hydrogen by offshore off-grid superconducting wind turbine. The method comprises the following steps: electrolyzing seawater to obtain hydrogen based on electric energy output by an offshore off-grid superconducting wind turbine generator, liquefying the hydrogen into prepared liquid hydrogen, and outputting a part of the liquid hydrogen as the refrigerant of the offshore off-grid superconducting wind turbine generator. The device comprises a liquid preparation platform, an offshore off-grid superconducting wind turbine generator, a seawater electrolysis unit, a hydrogen liquefaction unit and a liquid hydrogen storage unit, wherein the power ends of the seawater electrolysis unit and the hydrogen liquefaction unit are connected with the output end of the offshore off-grid superconducting wind turbine generator, and the hydrogen liquefaction unit is connected with the (Continued)

coolant input end of the offshore off-grid superconducting wind turbine generator.

1 Claim, 8 Drawing Sheets (52) U.S. Cl.
CPC ........... *F25J 1/0065* (2013.01); *F25J 1/0072* (2013.01); *F25J 1/0208* (2013.01); *F25J 1/0236* (2013.01); *F25J 2205/86* (2013.01); *F25J 2260/30* (2013.01); *H02J 9/04* (2013.01)

(56) References Cited

U.S. PATENT DOCUMENTS

| | | | | |
|---|---|---|---|---|
| 2006/0222912 | A1* | 10/2006 | Smith | H01M 8/186 |
| | | | | 429/417 |
| 2007/0248849 | A1* | 10/2007 | Preidel | H01M 8/04007 |
| | | | | 62/7 |
| 2010/0083695 | A1 | 4/2010 | Kundig | |
| 2010/0107684 | A1* | 5/2010 | Minta | F25J 1/0297 |
| | | | | 62/623 |
| 2015/0007587 | A1 | 1/2015 | Frank et al. | |
| 2017/0321332 | A1* | 11/2017 | Gupta | C25B 1/04 |
| 2018/0347897 | A1* | 12/2018 | Cardella | F25J 1/0067 |
| 2019/0032854 | A1* | 1/2019 | Dachauer | F17C 13/04 |
| 2021/0331917 | A1* | 10/2021 | Turney | F25J 1/0208 |
| 2022/0316076 | A1* | 10/2022 | Peschel | C25B 15/085 |
| 2022/0321042 | A1* | 10/2022 | Larsen | F03D 80/82 |
| 2023/0212759 | A1* | 7/2023 | Kromer | C01B 13/0277 |
| | | | | 205/637 |

FOREIGN PATENT DOCUMENTS

| | | | | |
|---|---|---|---|---|
| CN | 206126987 U | | 4/2017 | |
| CN | 201620758633 U | * | 4/2017 | |
| CN | 109175980 A | * | 1/2019 | |
| CN | 112909988 A | * | 6/2021 | ............... C25B 1/04 |
| CN | 113549943 A | | 10/2021 | |
| CN | 215163199 U | | 12/2021 | |
| CN | 113913845 A | * | 1/2022 | |
| CN | 114111215 A | | 3/2022 | |
| CN | 114156512 A | | 3/2022 | |
| CN | 216280615 U | | 4/2022 | |
| DE | 10084837 B4 | * | 9/2010 | ........ H01M 8/04029 |
| JP | 2001-255033 A | | 9/2001 | |
| JP | 2005-220946 A | | 8/2005 | |
| JP | 2013231381 A | * | 11/2013 | |
| WO | WO-2019115847 A1 | * | 6/2019 | ............... C02F 1/14 |

OTHER PUBLICATIONS

Lu, "Patent literature research 2017," The Patent Documentation Department of China National Intellectual Property Administration Patent Office. Eight pages, Sep. 2018.

Chinese communication, with English translation, dated Nov. 29, 2022 in corresponding Chinese patent application No. 202210428868.6.

* cited by examiner

METHOD AND DEVICE FOR MANUFACTURING LIQUID HYDROGEN BY OFFSHORE OFF-GRID SUPERCONDUCTING WIND TURBINE

CROSS-REFERENCE TO RELATED APPLICATION

This patent application claims the benefit and priority of Chinese Patent Application No. 202210428868.6, filed with the China National Intellectual Property Administration on Apr. 22, 2022, the disclosure of which is incorporated by reference herein in its entirety as part of the present application.

TECHNICAL FIELD

The present disclosure relates to the development technology of wind power generation, in particular to a method and a device for manufacturing liquid hydrogen by offshore off-grid superconducting wind turbine.

BACKGROUND

At present, offshore wind power has been developed rapidly. In the future, the unit capacity of the wind turbine generator in the offshore wind power hydrogen production system will be large, resulting in high cost of single-machine transportation and hoisting. The superconducting wind turbine generator is high in power density, and the volume and weight can be reduced to less than half of those of the traditional motor, so that the capacity expansion problem of the offshore wind turbine generator can be fundamentally solved. Hydrogen production from fossil fuels and industrial by-products occupies the main position of hydrogen production structures at low cost. Steam methane reforming (SMR) is the most mature hydrogen production technology in industry, accounting for about 70% of hydrogen production in the world, but a large amount of carbon dioxide can be produced during hydrogen production. As the price of offshore wind power generation continues to drop, the cost of water electrolysis hydrogen production can be greatly reduced through wind turbine power generation, and the hydrogen production process is a carbon neutral situation.

It is difficult to match the time and amount of offshore wind power generation with the demand side, requiring large-scale energy storage systems. Deep-sea offshore wind farms face stability and reliability issues, and the submarine cable cost is extremely high. The strong randomness, volatility and intermittence of wind energy can aggravate the impact of the offshore wind farm on the large power grid. Compared with the expensive submarine cables and battery energy storage system, the electric energy generated by the wind turbine can be converted into liquid hydrogen, and the liquid hydrogen can be transported back to the shore by ship, so that the problems of electric energy storage, transmission and grid connection of the super-large offshore wind farm can be solved at low cost.

SUMMARY

The technical problems to be solved by the present disclosure: aiming at the above-mentioned problems in the prior art, provided are a method and a device for manufacturing liquid hydrogen by offshore off-grid superconducting wind turbine. The present disclosure can utilize the power generation of a superconducting wind turbine to prepare the liquid hydrogen and cool the superconducting wind turbine, so that the capacity expansion problem of an offshore wind turbine is effectively solved, and simultaneously the problems of electric energy storage, transmission and grid connection of an offshore wind farm are solved.

In order to solve the technical problem, the technical scheme adopted by the present disclosure is as follows:

The present disclosure provides a method for manufacturing liquid hydrogen by offshore off-grid superconducting wind turbine. The method comprises the following steps: on an offshore superconducting wind power platform, electrolyzing seawater to obtain hydrogen based on electric energy output by an offshore off-grid superconducting wind turbine generator, liquefying the hydrogen into prepared liquid hydrogen, and outputting a part of the liquid hydrogen as the refrigerant of the offshore off-grid superconducting wind turbine generator.

The present disclosure provides a device for manufacturing liquid hydrogen by offshore off-grid superconducting wind turbine used for the method for manufacturing liquid hydrogen by offshore off-grid superconducting wind turbine, comprising:

a liquid preparation platform, used as a supporting platform;

an offshore off-grid superconducting wind turbine generator, used for wind power generation;

a seawater electrolysis unit, used for electrolyzing seawater to obtain hydrogen;

a hydrogen liquefaction unit, used for liquefying the hydrogen into liquid hydrogen;

a liquid hydrogen storage unit, used for storing the prepared liquid hydrogen;

the seawater electrolysis unit, the hydrogen liquefaction unit and the liquid hydrogen storage unit are connected in sequence and respectively arranged on the liquid preparation platform; the power ends of the seawater electrolysis unit and the hydrogen liquefaction unit are respectively connected with the power output end of the offshore off-grid superconducting wind turbine generator. The output end of the hydrogen liquefaction unit or the output end of the liquid hydrogen storage unit is connected with the coolant input port of the offshore off-grid superconducting wind turbine generator to output the liquid hydrogen as the refrigerant of the offshore off-grid superconducting wind turbine generator.

Optionally, the seawater electrolysis unit comprises a seawater desalination component and a water electrolysis hydrogen production module which are connected with each other. The seawater desalination component comprises a seawater pump, a multistage filtration component, a booster pump and a reverse osmosis filtration component which are connected in sequence. The output end of the reverse osmosis filtration component comprises a fresh water outlet and a brine outlet. The brine outlet is further connected with an energy recovery device to recover the kinetic energy of high-pressure brine discharged from the brine outlet of the reverse osmosis filtration component. The seawater pump and booster pump are connected with the power output end of the offshore off-grid superconducting wind turbine generator.

Optionally, the water electrolysis hydrogen production module comprises a PEM electrolytic bath and an AC-DC converter. The PEM electrolytic bath comprises an anode plate and a cathode plate which are arranged in a gap. An anode diffusion layer, a proton exchange membrane and a cathode diffusion layer are sequentially arranged between the anode plate and the cathode plate in a gap. The surface of the side, close to the anode diffusion layer, of the proton exchange membrane is provided with an anode catalyst layer. The surface of the side, close to the cathode diffusion layer, of the proton exchange membrane is provided with a cathode catalyst layer. The AC side of the AC-DC converter is connected with the power output end of the offshore off-grid superconducting wind turbine generator, and the DC side of the AC-DC converter is connected with the anode plate and the cathode plate.

Optionally, the hydrogen liquefaction unit comprises:
A hydrogen purification component, used for hydrogen purification;
A hydrogen-helium heat exchanger, used for hydrogen-helium heat exchange so as to realize hydrogen liquidation;
A helium refrigeration module, used for using helium as the refrigerant to provide helium refrigeration for hydrogen-helium heat exchange;
A hydrogen liquefaction module, used for carrying out hydrogen-helium heat exchange on the purified hydrogen through the hydrogen-helium heat exchanger to realize hydrogen liquefaction to obtain the liquid hydrogen;
The output end of the hydrogen purification component is connected with the hydrogen liquefaction module. The hydrogen liquefaction module is interconnected with a hydrogen transmission channel in the hydrogen-helium heat exchanger. The helium refrigeration module is interconnected with a helium transmission channel in the hydrogen-helium heat exchanger. The liquid hydrogen output port of the hydrogen liquefaction module is connected with the liquid hydrogen storage unit.

Optionally, the helium refrigeration module comprises a helium compressor, a primary helium heat exchanger, a liquid nitrogen precooler, a secondary helium heat exchanger and a helium expander. The output end of the helium compressor is connected with the inlet of the helium transmission channel of the hydrogen-helium heat exchanger through the first heat exchange channel of the primary helium heat exchanger, the first precooling channel of the liquid nitrogen precooler, the first heat exchange channel of the secondary helium heat exchanger and the helium expander in sequence. The outlet of the helium transmission channel of the hydrogen-helium heat exchanger is connected with the air inlet of the helium compressor through the second heat exchange channel of the secondary helium heat exchanger and the second heat exchange channel of the primary helium heat exchanger The hydrogen liquefaction module comprises a hydrogen compressor, a primary hydrogen heat exchanger, a secondary hydrogen heat exchanger, a throttle valve and a gas-liquid separator. The output end of the hydrogen purification unit passes through the hydrogen compressor, the first heat exchange channel of the primary hydrogen heat exchanger, the second precooling channel of the liquid nitrogen precooler, the first heat exchange channel of the secondary hydrogen heat exchanger, the hydrogen transmission channel of the hydrogen-helium heat exchanger and the throttle valve in sequence to enter the gas-liquid separator. A hydrogen reflux port is formed in the top of the gas-liquid separator. The hydrogen reflux port is connected with the air inlet of the hydrogen compressor after sequentially passing through the second heat exchange channel of the secondary hydrogen heat exchanger and the second heat exchange channel of the primary hydrogen heat exchanger; the liquid hydrogen output port of the gas-liquid separator is connected with the liquid hydrogen storage unit.

Optionally, the liquid hydrogen storage unit comprises a liquid hydrogen storage tank which is composed of an outer shell and an inner container and of a double-layer structure. A vacuum or thermal insulation material layer is arranged between the outer shell and the inner container. The liquid hydrogen storage tank is respectively provided with a liquid hydrogen filling port, a liquid hydrogen discharge port, a hydrogen discharge port and an in-tank pressure monitoring module.

Optionally, the offshore off-grid superconducting wind turbine generator comprises a superconducting generator, a converter and a transformer which are connected in sequence. The superconducting wind turbine generator is connected with a superconducting liquid hydrogen refrigeration unit for cooling a superconductor in the superconducting wind turbine generator; the output end of the hydrogen liquefaction unit or the input end of the liquid hydrogen storage unit is connected with the coolant input port of the superconducting liquid hydrogen refrigeration unit to output the liquid hydrogen as the refrigerant of the offshore off-grid superconducting wind turbine generator.

Optionally, the superconducting liquid hydrogen refrigeration unit comprises a hydrogen storage cold box, a low-temperature circulating pump, a refrigerator and a heat exchanger. The hydrogen storage cold box is provided with the coolant input port of the superconducting liquid hydrogen refrigeration unit for inputting the liquid hydrogen. The low-temperature circulating pump, the refrigerator and the heat exchanger are connected end to end to form a liquid hydrogen reflux channel. The liquid hydrogen output end of the hydrogen storage cold box is connected with the liquid hydrogen reflux channel for supplying the liquid hydrogen for the liquid hydrogen reflux channel.

Optionally, the device further comprises a standby power module. The output end of the standby power module is respectively connected with the power ends of the seawater electrolysis unit and the hydrogen liquefaction unit; the standby power module is a storage battery, and the storage battery is connected with the power output end of the offshore off-grid superconducting wind turbine generator for charging; or the standby power module is a hydrogen fuel cell, and the hydrogen input end of the hydrogen fuel cell is connected with the output end of the hydrogen liquefaction unit or the input end of the liquid hydrogen storage unit to use hydrogen as the fuel of the hydrogen fuel cell.

Compared with the prior art, the present disclosure mainly has the following advantages. The method for manufacturing liquid hydrogen by offshore off-grid superconducting wind power in the present disclosure comprises the following steps: on an offshore superconducting wind power platform, electrolyzing seawater to obtain hydrogen based on electric energy output by an offshore off-grid superconducting wind turbine generator, liquefying the hydrogen into prepared liquid hydrogen, and outputting a part of the liquid hydrogen as the refrigerant of the offshore off-grid superconducting wind turbine generator. The present disclosure can utilize the power generation of a superconducting wind turbine to prepare the liquid hydrogen and cool the superconducting wind turbine, so that the capacity expansion problem of an offshore wind turbine is effectively solved, and simultaneously the problems of electric energy storage, transmission and grid connection of an offshore wind farm are solved.

Reference signs: 1, liquid preparation platform; 2, offshore off-grid superconducting wind turbine generator; 21, superconducting generator; 22, converter; 23, transformer; 24, superconducting liquid hydrogen refrigeration unit; 241, hydrogen storage cold box; 242, low-temperature circulating pump; 243, refrigerator; 244, heat exchanger; 3, seawater electrolysis unit; 31, seawater desalination component; 311, seawater pump; 312, multistage filtration component; 313, booster pump; 314, reverse osmosis filtration component; 315, energy recovery device; 32, water electrolysis hydrogen production module; 321, PEM electrolytic bath; 322, AC-DC converter; 323, anode plate; 324, cathode plate; 325, anode diffusion layer; 326, proton exchange membrane; 327, cathode diffusion layer; 328, anode catalyst layer; 329, cathode catalyst layer; 4, hydrogen liquefaction unit; 41, hydrogen purification component; 42, hydrogen-helium heat exchanger; 43, helium refrigeration module; 431, helium compressor; 432, primary helium heat exchanger; 433, liquid nitrogen precooler; 434, secondary helium heat exchanger; 435, helium expander; 44, hydrogen liquefaction module; 441, helium compressor; 442, primary hydrogen heat exchanger; 443, secondary hydrogen heat exchanger; 444, throttle valve; 445, gas-liquid separator; 5, liquid hydrogen storage unit; 51, outer shell; 52, inner container; 53, vacuum or thermal insulation material layer; 54, liquid hydrogen filling port; 55, liquid hydrogen discharge port; 56, hydrogen discharge port; 57, in-tank pressure monitoring module; and 6, standby power module.

DETAILED DESCRIPTION OF THE EMBODIMENTS

The following describes exemplary embodiments of the present disclosure in more detail with reference to the attached figures. Although the exemplary embodiments of the present disclosure are shown in the attached figures, it should be understood that the present disclosure may be implemented in various forms and should not be limited by the embodiments set forth herein. On the contrary, the embodiments are provided to enable a more thorough understanding of the present disclosure and completely convey the scope of the present disclosure to a person skilled in the art.

Firstly, the embodiment provides a method for manufacturing liquid hydrogen by offshore off-grid superconducting wind turbine. The method comprises the following steps: on an offshore superconducting wind power platform, electrolyzing seawater to obtain hydrogen based on electric energy output by an offshore off-grid superconducting wind turbine generator (without grid connection), liquefying the hydrogen into prepared liquid hydrogen, and outputting a part of the liquid hydrogen as the refrigerant of the offshore off-grid superconducting wind turbine generator. Through the above-mentioned manner, the method in the embodiment can utilize the power generation of a superconducting wind turbine to prepare the liquid hydrogen and cool the superconducting wind turbine, so that the capacity expansion problem of an offshore wind turbine is effectively solved, and simultaneously the problems of electric energy storage, transmission and grid connection of an offshore wind farm are solved.

Figure 1:
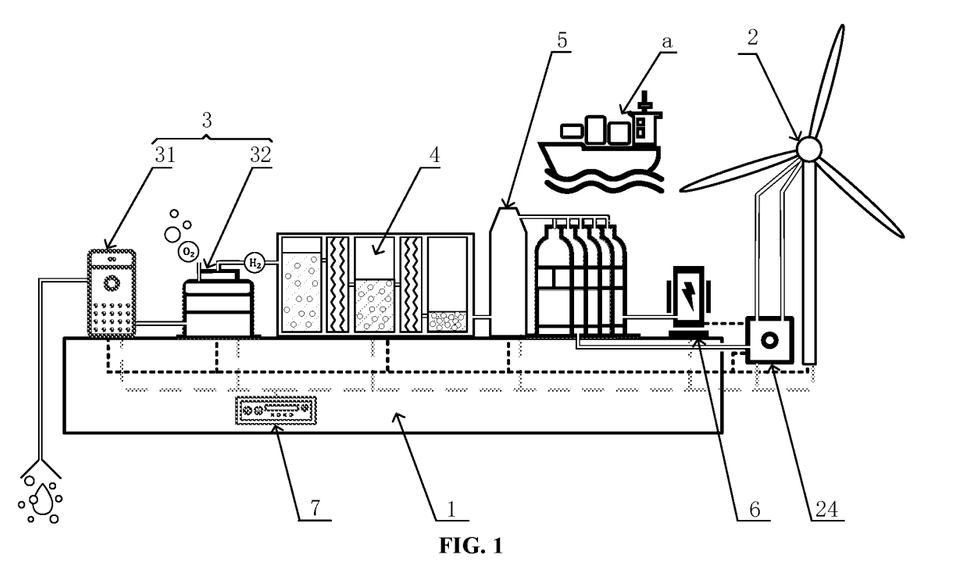
FIG. 1 is a structural schematic diagram of a device in one embodiment of the present disclosure.

Next, as shown in FIG. 1, the embodiment provides a device for manufacturing liquid hydrogen by offshore off-grid superconducting wind power used for the method for manufacturing liquid hydrogen by offshore off-grid superconducting wind turbine, comprising:

a liquid preparation platform 1, used as a supporting platform;

an offshore off-grid superconducting wind turbine generator 2, used for wind power generation;

a seawater electrolysis unit 3, used for electrolyzing seawater to obtain hydrogen;

a hydrogen liquefaction unit 4, used for liquefying the hydrogen into liquid hydrogen; and a liquid hydrogen storage unit 5, used for storing the prepared liquid hydrogen.

The seawater electrolysis unit 3, the hydrogen liquefaction unit 4 and the liquid hydrogen storage unit 5 are connected in sequence and respectively arranged on the liquid preparation platform 1. The power ends of the seawater electrolysis unit 3 and the hydrogen liquefaction unit 4 are respectively connected with the power output end of the offshore off-grid superconducting wind turbine generator 2; and the output end of the hydrogen liquefaction unit 4 or the output end of the liquid hydrogen storage unit 5 is connected with the coolant input port of the offshore off-grid superconducting wind turbine generator 2 to output the liquid hydrogen as the refrigerant of the offshore off-grid superconducting wind turbine generator 2, so that a part of the liquid hydrogen can be output as the refrigerant of the offshore off-grid superconducting wind turbine generator. Referring to FIG. 1, through the liquid hydrogen storage unit 5, the liquid hydrogen can be transported to the land after being packaged by a ship (referring to a as shown in FIG. 1), so that the problems of electric energy storage, transmission and grid connection of an offshore wind farm are solved, and the capacity expansion problem of an offshore wind turbine is effectively solved.

As shown in FIG. 1, the seawater electrolysis unit 3 in the embodiment comprises a seawater desalination component 31 and a water electrolysis hydrogen production module 32 which are connected with each other.

Figure 2:
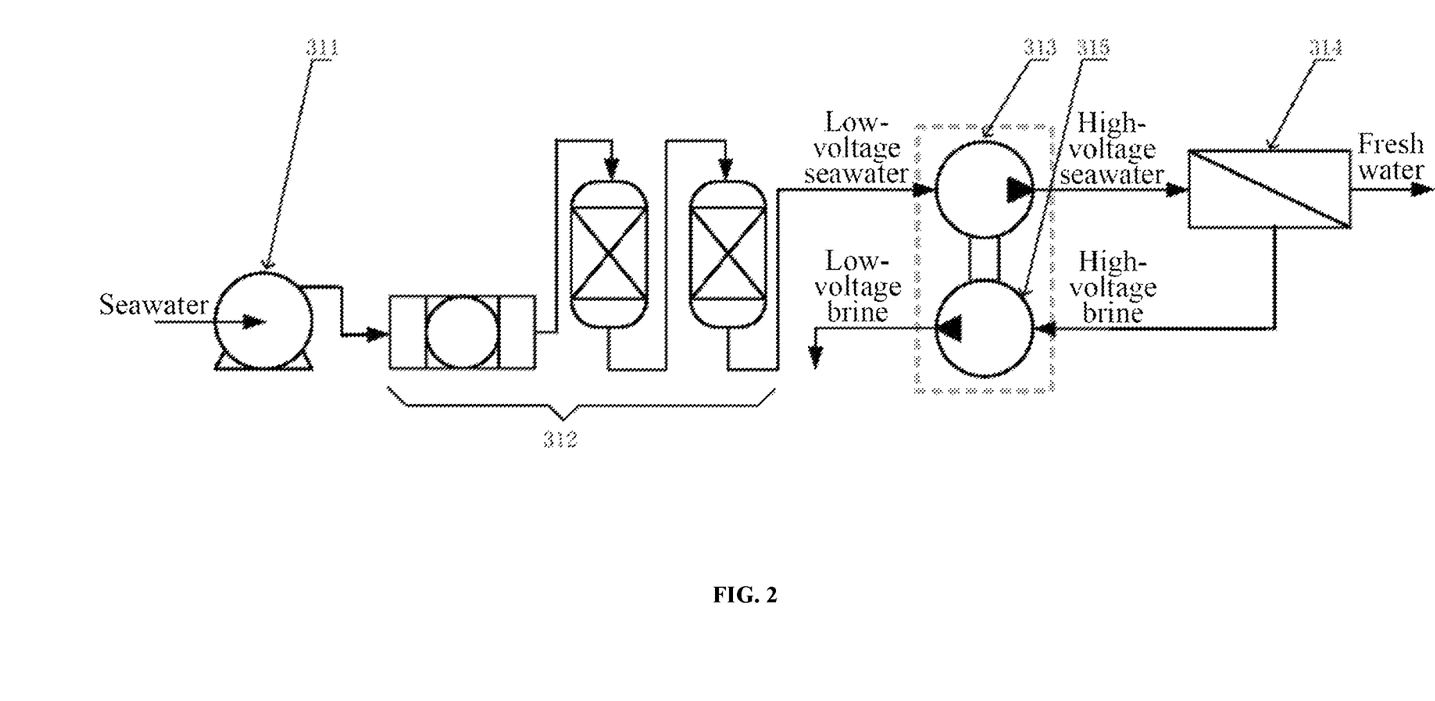
FIG. 2 is a structural schematic diagram of a seawater electrolysis unit in one embodiment of the present disclosure.

As shown in FIG. 2, the seawater desalination component 31 in the embodiment comprises a seawater pump 311, a multistage filtration component 312, a booster pump 313 and a reverse osmosis filtration component 314 which are connected in sequence. The output end of the reverse osmosis filtration component 314 comprises a fresh water outlet and a brine outlet. The brine outlet is further connected with an energy recovery device 315 to recover the kinetic energy of high-pressure brine discharged from the brine outlet of the reverse osmosis filtration component 314. The seawater pump 311 and booster pump 313 are connected with the power output end of the offshore off-grid superconducting wind turbine generator 2. The energy recovery device 315 is used for recovering the kinetic energy of high-pressure brine discharged from the brine outlet of the reverse osmosis filtration component 314, so that the energy consumption utilization rate of the seawater desalination component 31 can be improved, and the energy consumption of the seawater desalination component 31 is greatly reduced. Wherein, the seawater pump 311 is used for extracting seawater from the sea. The liquid preparation platform 1 is located on the sea, and thus seawater can be easily obtained. The multistage filtration component 312 is used for filtering seawater so as to prolong the service life of the reverse osmosis filtration component 314. The multistage filtration component 312 can select the required filtering stages and the filtering materials of each stage according to the needs. For example, as an optional embodiment, the multistage filtration component 312 in the embodiment comprises three stages of filters altogether. The first-stage filter is a backwash filter. The second-stage filter is a medium filter with various filtering media. The third-stage filter is a carbon filter. The water outlet of the seawater pump 311 is connected with the water inlet of the backwash filter. The water outlet of the backwash filter is connected with the water inlet of the medium filter. The water outlet of the medium filter is connected with the water inlet of the carbon filter. The water outlet of the carbon filter is connected with the low-pressure seawater inlet of an energy recovery and pressurization integrated machine. The high-pressure seawater outlet of the energy recovery and pressurization integrated machine is connected with the high-pressure seawater inlet of the reverse osmosis filtration component 314. The high-pressure brine outlet of the reverse osmosis filtration component 314 is connected with the high-pressure brine inlet of the energy recovery and pressurization integrated machine. The booster pump 313 is used for boosting seawater for the reverse osmosis filtration component 314. The reverse osmosis filtration component 314 is mainly based on reverse osmosis membrane technology. In the reverse osmosis membrane technology, smaller water molecules in the reverse osmosis membrane can pass through the reverse osmosis filtration component 314, but larger ions cannot pass through the reverse osmosis filtration component 314, so that the purpose of seawater desalination is achieved. Seawater desalination by the reverse osmosis membrane technology is the prior art, and only the application of the reverse osmosis membrane technology is involved in the embodiment, so the structure and components of the reverse osmosis membrane are not described in detail here. The energy recovery device 315 is used for recovering the kinetic energy of high-pressure brine discharged from the brine outlet of the reverse osmosis filtration component 314, and the recovery function can be used for power generation. In the embodiment, the energy recovery device 315 and the booster pump 313 form the energy recovery and pressurization integrated machine, and also can be of split structures. In the embodiment, the seawater can be effectively desalinated by the three stages of filters and the reverse osmosis filtration component 314, so that the water quality required for electrolysis is ensured, and the service life of the water electrolysis hydrogen production module 32 is prolonged.

Figure 3:
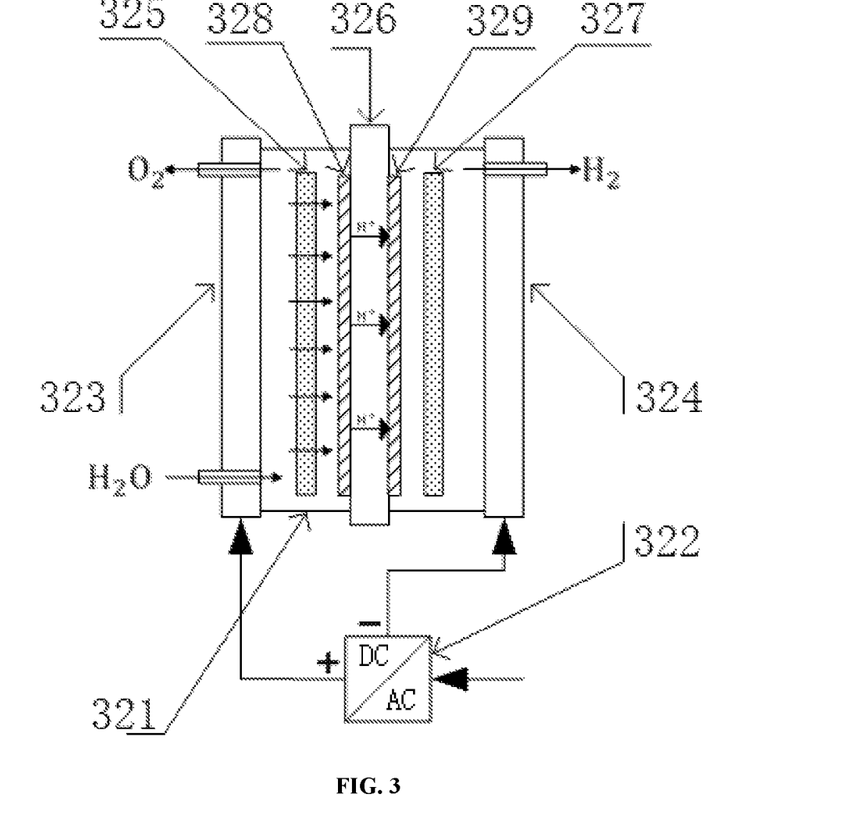
FIG. 3 is a structural schematic diagram of a water electrolysis hydrogen production module in one embodiment of the present disclosure.

As shown in FIG. 3, the water electrolysis hydrogen production module 32 in the embodiment comprises a PEM electrolytic bath 321 and an AC-DC converter 322. The PEM electrolytic bath 321 comprises an anode plate 323 and a cathode plate 324 which are arranged in a gap. An anode diffusion layer 325, a proton exchange membrane 326 and a cathode diffusion layer 327 are sequentially arranged between the anode plate 323 and the cathode plate 324 in a gap. The surface of the side, close to the anode diffusion layer 325, of the proton exchange membrane 326 is provided with an anode catalyst layer 328. The surface of the side, close to the cathode diffusion layer 327, of the proton exchange membrane 326 is provided with a cathode catalyst layer 329. The AC side of the AC-DC converter 322 is connected with the power output end of the offshore off-grid superconducting wind turbine generator 2, and the DC side of the AC-DC converter 322 is connected with the anode plate 323 and the cathode plate 324.

The PEM electrolytic bath 321 is an electrolytic container which is used for accommodating desalinated seawater and made of polytetrafluoroethylene as a sealing material. The AC-DC converter 322 is used for converting alternating current output from the power output end of the offshore off-grid superconducting wind turbine generator 2 into direct current required for electrolysis. The anode plate 323 is connected with the DC side anode of the AC-DC converter 322, and the cathode plate 324 is connected with the DC side cathode of the AC-DC converter 322. In the electrolysis process, the anode plate 323 generates oxygen $O_2$ through electrolysis, and the cathode plate 324 generates hydrogen $H_2$ through electrolysis. In the embodiment, the anode plate 323 and cathode plate 324 are made of corrosion-resistant titanium. The anode diffusion layer 325 is made of a porous titanium plate. The proton exchange membrane 326 is made of a perfluorosulfonic acid membrane. The cathode diffusion layer 327 is made of carbon paper. The anode catalyst layer 328 is made of $IrO_2$ electrocatalyst for oxygen evolution. The cathode catalyst layer 329 is made of Pt-AC electrocatalyst for hydrogen evolution. Through the above-mentioned structures and materials, the electrolysis efficiency of the water electrolysis hydrogen production module 32 can be improved, and the service life of the water electrolysis hydrogen production module 32 can be prolonged.

Figure 4:
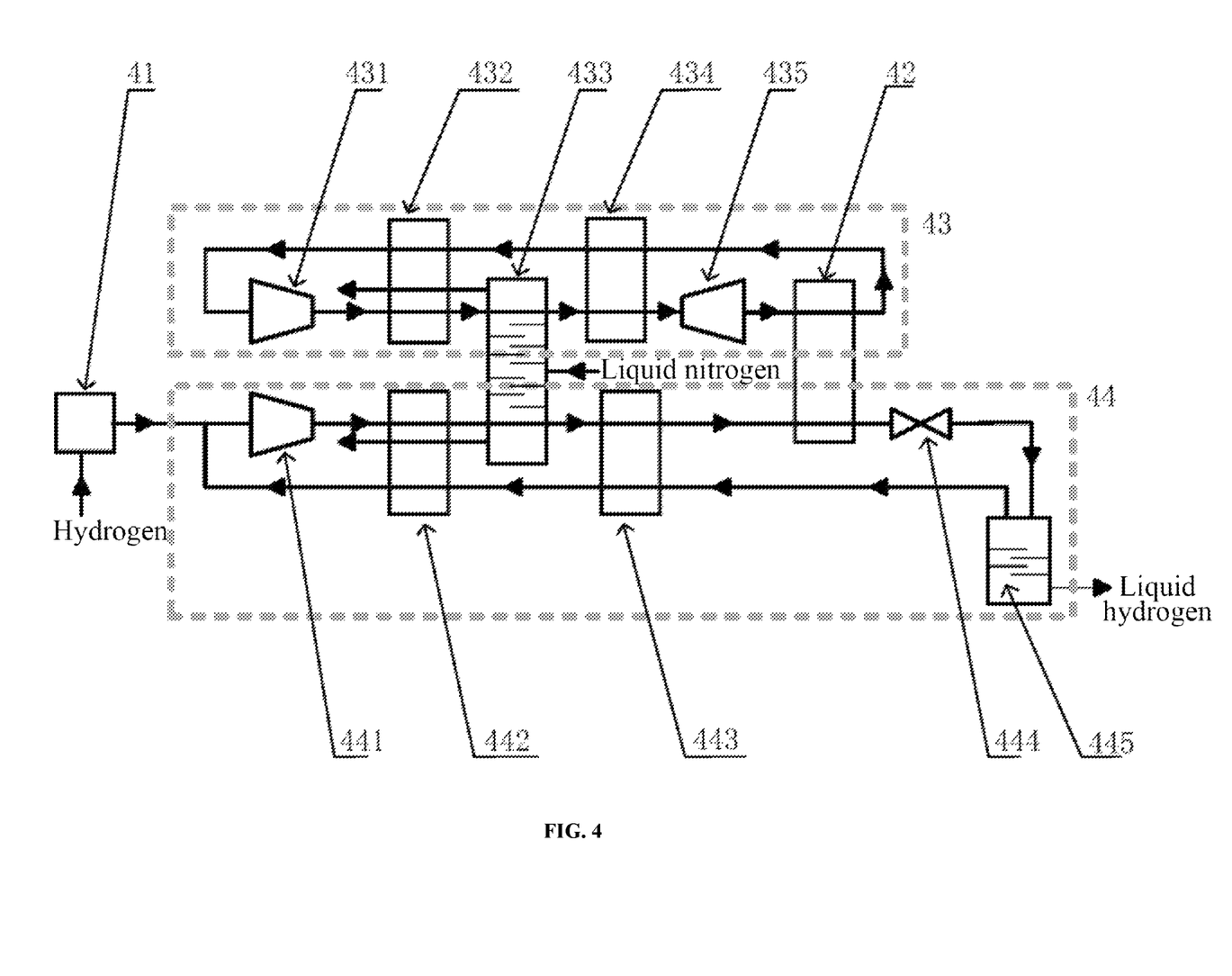
FIG. 4 is a structural schematic diagram of a hydrogen liquefaction unit in one embodiment of the present disclosure.

As shown in FIG. 4, the hydrogen liquefaction unit in the embodiment comprises:
a hydrogen purification component 41, used for hydrogen purification;
a hydrogen-helium heat exchanger 42, used for hydrogen-helium heat exchange so as to realize hydrogen liquidation;
a helium refrigeration module 43, used for using helium as the refrigerant to provide helium refrigeration for hydrogen-helium heat exchange; and
a hydrogen liquefaction module 44, used for carrying out hydrogen-helium heat exchange on the purified hydrogen through the hydrogen-helium heat exchanger 42 to realize hydrogen liquefaction to obtain the liquid hydrogen.

The output end of the hydrogen purification component 41 is connected with the hydrogen liquefaction module 44. The hydrogen liquefaction module 44 is interconnected with a hydrogen transmission channel in the hydrogen-helium heat exchanger 42. The helium refrigeration module 43 is interconnected with a helium transmission channel in the hydrogen-helium heat exchanger 42. The liquid hydrogen output port of the hydrogen liquefaction module 44 is connected with the liquid hydrogen storage unit 5.

The hydrogen purification unit 41 is used for hydrogen purification, and the existing four-tower two-average process can be used for hydrogen purification according to the needs.

The hydrogen-helium heat exchanger 42 is used for hydrogen-helium heat exchange to realize hydrogen liquefaction, and mainly comprises a helium transmission channel and a hydrogen transmission channel which are independent from each other and realize heat conduction through metal inner cavity walls.

As shown in FIG. 4, the helium refrigeration module 43 comprises a helium compressor 431, a primary helium heat exchanger 432, a liquid nitrogen precooler 433, a secondary helium heat exchanger 434 and a helium expander 435. The output end of the helium compressor 431 is connected with the inlet of the helium transmission channel of the hydrogen-helium heat exchanger 42 through the first heat exchange channel of the primary helium heat exchanger 432, the first precooling channel of the liquid nitrogen precooler 433, the first heat exchange channel of the secondary helium heat exchanger 434 and the helium expander 435 in sequence. The outlet of the helium transmission channel of the hydrogen-helium heat exchanger 42 is connected with the air inlet of the helium compressor 431 through the second heat exchange channel of the secondary helium heat exchanger 434 and the second heat exchange channel of the primary helium heat exchanger 432. In the working state, the working medium helium is compressed by the helium compressor 431, then cooled by the primary helium heat exchanger 432, the liquid nitrogen precooler 433 and the secondary helium heat exchanger 434 step by step, then expanded in the helium expander 435 to a low temperature to enter the hydrogen-helium heat exchanger 42 to participate in hydrogen liquefaction, and finally returned to the input end of the helium compressor 431 to complete the cycle.

As shown in FIG. 4, the hydrogen liquefaction module 44 comprises a hydrogen compressor 441, a primary hydrogen heat exchanger 442, a secondary hydrogen heat exchanger 443, a throttle valve 444 and a gas-liquid separator 445. The output end of the hydrogen purification unit 41 passes through the hydrogen compressor 441, the first heat exchange channel of the primary hydrogen heat exchanger 442, the second precooling channel of the liquid nitrogen precooler 433, the first heat exchange channel of the secondary hydrogen heat exchanger 443, the hydrogen transmission channel of the hydrogen-helium heat exchanger 42 and the throttle valve 444 in sequence to enter the gas-liquid separator 445. The top of the gas-liquid separator 445 is provided with a hydrogen reflux port. The hydrogen reflux port is connected with the air inlet of the hydrogen compressor 441 after passing through the second heat exchange channel of the secondary hydrogen heat exchanger 443 and the second heat exchange channel of the primary hydrogen heat exchanger 442 in sequence. The liquid hydrogen output port of the gas-liquid separator 445 is connected with the liquid hydrogen storage unit 5. In the working state, the hydrogen purification unit 41 purifies hydrogen. The purified hydrogen is compressed by the hydrogen compressor 441 and cooled by the primary hydrogen heat exchanger 442, the liquid nitrogen precooler 433 and the secondary hydrogen heat exchanger 443 step by step. After the hydrogen is cooled by cold helium in the hydrogen helium heat exchanger 42, the cooled hydrogen is sent to the gas-liquid separator 445 through the throttle valve 444 to obtain liquid hydrogen which is stored in the liquid hydrogen storage unit 5. After the hydrogen gas passes through the secondary hydrogen heat exchanger 443 and the primary hydrogen heat exchanger 442, hydrogen is supplemented together with the hydrogen from the hydrogen purification component 41 to carry out the next cycle of liquefaction. In the embodiment, the liquid nitrogen precooler 433 comprises two precooling channels for sharing the same liquid nitrogen precooler 433 by the helium refrigeration module 43 and the hydrogen liquefaction module 44. In addition, two independent liquid nitrogen precoolers 433 can be used as required to precool the liquid nitrogen for the helium refrigeration module 43 and the hydrogen liquefaction module 44 respectively.

Figure 5:
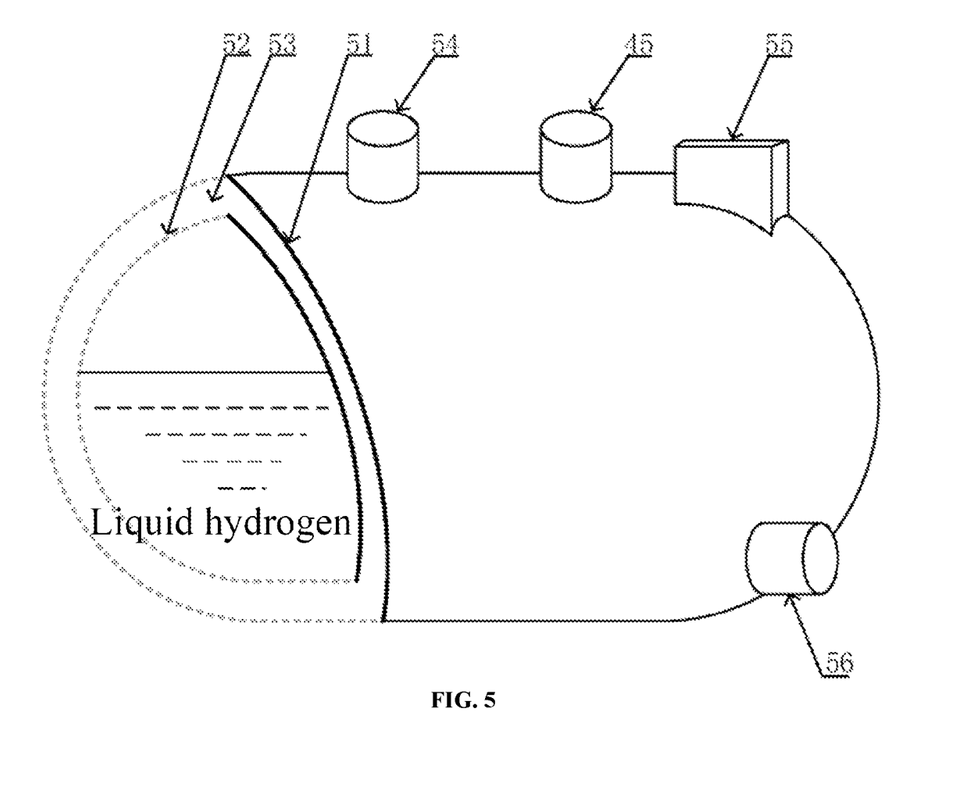
FIG. 5 is a structural schematic diagram of a liquid hydrogen storage unit in one embodiment of the present disclosure.

As shown in FIG. 5, the liquid hydrogen storage unit 5 in the embodiment comprises a liquid hydrogen storage tank which is composed of an outer shell 51 and an inner container 52 and of a double-layer structure. A vacuum or thermal insulation material layer 53 is arranged between the outer shell 51 and the inner container 52. The liquid hydrogen storage tank is respectively provided with a liquid hydrogen filling port 54, a liquid hydrogen discharge port 55, a hydrogen discharge port 56 and an in-tank pressure monitoring module 57. As shown in FIG. 5, the liquid hydrogen storage tank in the embodiment is specifically of a vacuum insulated elliptical structure of a double-shell structure. The vacuum or thermal insulation material layer 53 is specifically vacuum. In addition, the vacuum or thermal insulation material layer 53 can also be a thermal insulation material layer according to the needs.

The liquid hydrogen obtained by the hydrogen liquefaction module 44 enters the inner container 52 through the liquid hydrogen filling port 54 to be stored, and is insulated by the structure composed of the inner container 52, the vacuum or thermal insulation material layer 53 and the outer shell 51. If the in-tank pressure monitoring module 57 monitors that the degree of liquid hydrogen gasification in the liquid hydrogen storage unit 5 is too large, a part of hydrogen can be controlled to be released from the hydrogen discharge port 56 to relieve the in-tank pressure. The liquid hydrogen in the liquid hydrogen storage unit 5 can be transported from the liquid hydrogen outlet 55 to a hydrogen unloading unit for loading and unloading or transported to the superconducting liquid hydrogen refrigeration unit 24 to participate in superconducting refrigeration. In the embodiment, in the hydrogen unloading unit, a hydrogen loading and unloading high-pressure hose is led out from the liquid hydrogen storage device 4, and the other end of the hose is led to the buoy in the anchorage sea area of the hydrogen shipping vessel, so that the requirements of safe unloading and large operation window can be met by loading and unloading in the anchorage sea area outside the platform. The hydrogen unloading unit is equipped with a stop valve and a discharge/replacement valve.

Figure 6:
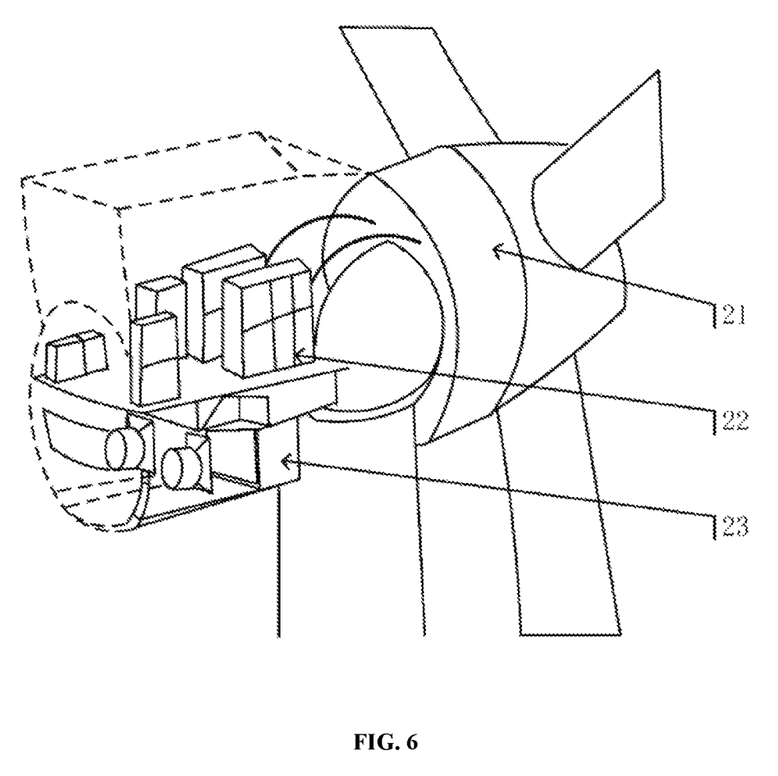
FIG. 6 is a structural schematic diagram of an offshore off-grid superconducting wind turbine generator in one embodiment of the present disclosure.

As shown in FIG. 6, the offshore off-grid superconducting wind turbine generator 2 in the embodiment comprises a superconducting generator 21, a converter 22 and a transformer 23 which are connected in sequence. The superconducting generator 21 is connected with a superconducting liquid hydrogen refrigeration unit 24 for cooling a superconductor in the superconducting generator 21. The output end of the hydrogen liquefaction unit 4 or the input end of the liquid hydrogen storage unit 5 is connected with the coolant input port of the superconducting liquid hydrogen refrigeration unit 24 to output the liquid hydrogen as the refrigerant of the offshore off-grid superconducting wind turbine generator 2. The difference between the offshore off-grid superconducting wind turbine generator 2 and the general grid-connected wind turbine generator is that the output end of the transformer 23 does not need to be connected to the power grid, but the electric energy is used for hydrogen production (the operation of the seawater electrolysis unit 3 and the hydrogen liquefaction unit 4), so that the liquid hydrogen which is convenient to store and transport is obtained.

Figure 7:
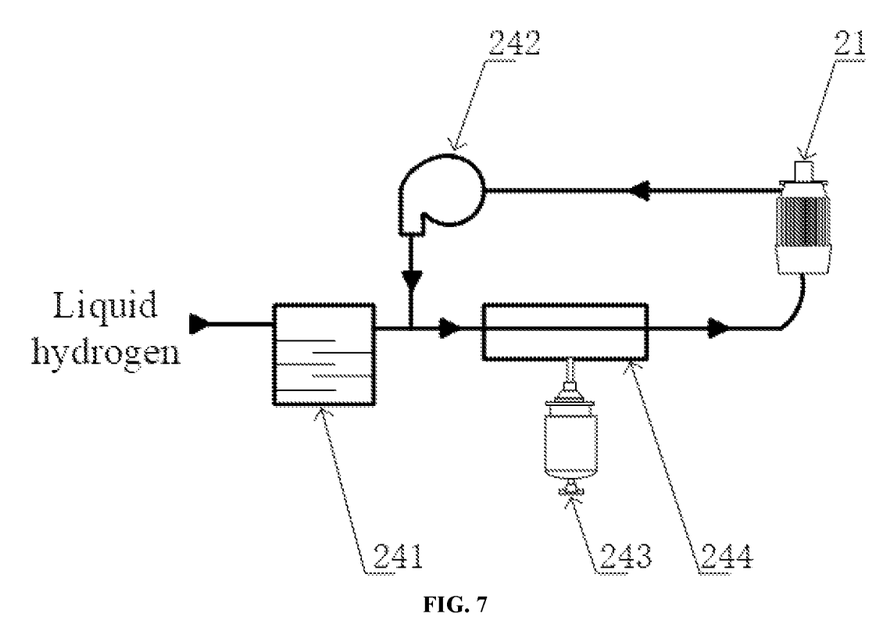
FIG. 7 is a structural schematic diagram of a superconducting liquid hydrogen refrigeration unit in one embodiment of the present disclosure.

As shown in FIG. 7, the superconducting liquid hydrogen refrigeration unit 24 in the embodiment comprises a hydrogen storage cold box 241, a low-temperature circulating pump 242, a refrigerator 243 and a heat exchanger 244. The hydrogen storage cold box 241 is provided with the coolant input port of the superconducting liquid hydrogen refrigeration unit 24 for inputting the liquid hydrogen. The low-temperature circulating pump 242, the refrigerator 243 and the heat exchanger 244 are connected end to end to form a liquid hydrogen reflux channel. The liquid hydrogen output from the hydrogen storage cold box 241 is connected with the liquid hydrogen reflux channel for supplying the liquid hydrogen for the liquid hydrogen reflux channel. In the working state, the liquid hydrogen enters the hydrogen storage cold box 241 from the output end of the hydrogen liquefaction unit 4 or the input end of the liquid hydrogen storage unit 5 to supplement low-temperature liquid hydrogen for superconducting refrigeration. Under the dynamic action of the low-temperature circulating pump 242, the liquid hydrogen obtains cold energy from the heat exchanger 244 through the refrigerator 243, soaks and cools the stator of the superconducting motor through the vacuum liquid hydrogen conveying pipeline, and then returns to the low-temperature circulating pump 242 through the vacuum liquid hydrogen conveying pipeline to complete the refrigeration cycle.

Referring to FIG. 1, the device in the embodiment further comprises a standby power module 6. The output end of the standby power module 6 is respectively connected with the power ends of the seawater electrolysis unit 3 and the hydrogen liquefaction unit 4. The standby power module 6 is a storage battery, and the storage battery is connected with the power output end of the offshore off-grid superconducting wind turbine generator 2 for charging. The standby power module 6 can supply power for the seawater electrolysis unit 3 and the hydrogen liquefaction unit 4 in the windless state, so that the continuous working ability of the seawater electrolysis unit 3 and the hydrogen liquefaction unit 4 is improved, and enough energy is provided for restart and recovery of the equipment.

Figure 8:
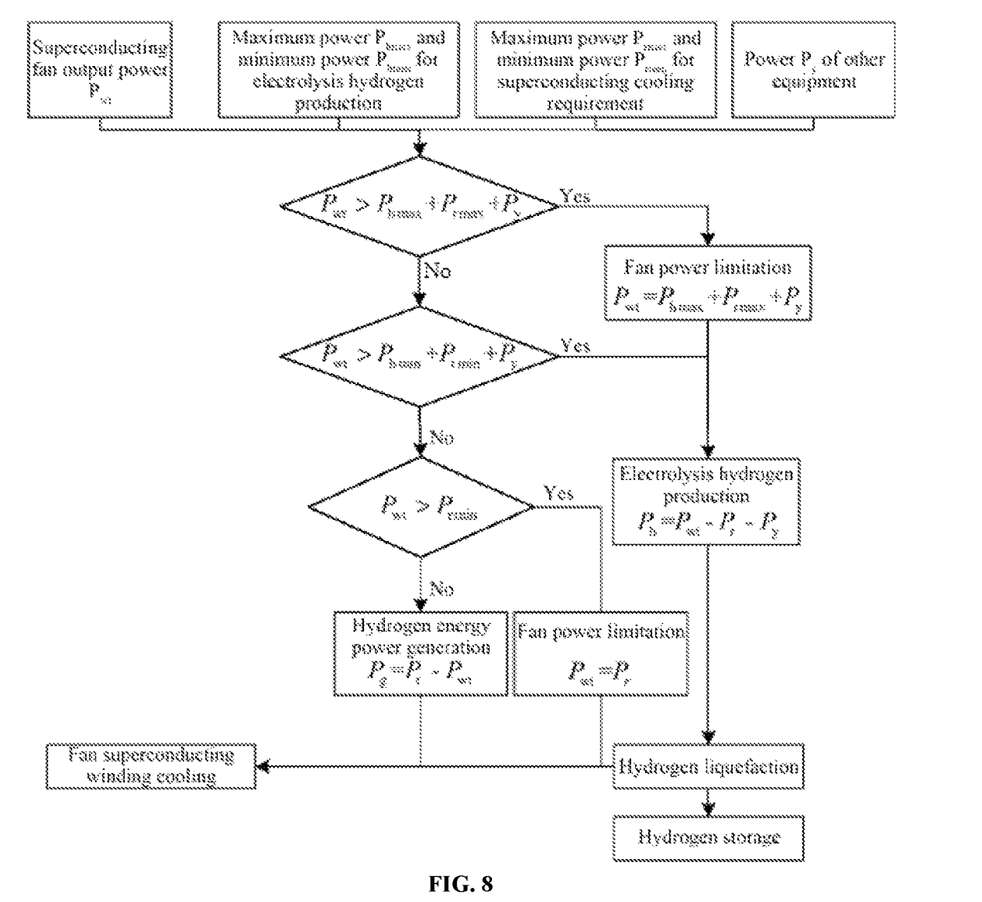
FIG. 8 is a mode control flow schematic diagram of a device in the present disclosure.

In addition, referring to FIG. 1, the device in the embodiment further comprises a control unit 7. The offshore off-grid superconducting wind turbine generator 2 further comprises a wind speed sensor. The wind speed sensor is connected with the control unit 7 so that the control unit 7 can obtain the current available power P according to the wind speed. The available power P is obtained according to the wind speed, which is a known technology of the wind turbine generator. For example, as an optional embodiment, the available power P corresponding to the wind speed can be obtained through the wind speed-power curve. The output end of the transformer 23 of the offshore off-grid superconducting wind turbine generator 2 is respectively provided with a voltage transformer and a current transformer to detect the output power $P_{wt}$ of the offshore off-grid superconducting wind turbine generator 2. Similar to the existing wind turbine generator, the offshore off-grid superconducting wind turbine generator 2 is provided with a pitch control mechanism for controlling the blade rotation speed, and then the output power $P_{wt}$ of the offshore off-grid superconducting wind turbine generator 2 is adjusted. The control end of the refrigerator 243 in the superconducting liquid hydrogen refrigeration unit 24 is connected with the control unit 7 for adjusting the refrigeration power $P_r$ of the superconducting liquid hydrogen refrigeration unit 24. The control end of the AC-DC converter 322 of the water electrolysis hydrogen production module 32 is connected with the control unit 7 for adjusting the electrolysis power $P_h$ of the water electrolysis hydrogen production module 32. The control end of the standby power module 6 is connected with the control unit 7 for adjusting the output power $P_g$ of the standby power supply. If the available power P satisfies that P is larger than $P_{hmax}$ plus $P_{rmax}$ plus $P_y$, the mode enters the maximum power hydrogen production and storage mode: the power of the offshore off-grid superconducting wind turbine generator 2 is limited by the variable pitch speed, so that the output power $P_{wt}$ of the offshore off-grid superconducting wind turbine generator 2 satisfies that $P_{wt}$ is equal to $P_{hmax}$ plus $P_{rmax}$ plus $P_y$, and the value of the electrolytic power $P_h$ of the water electrolysis hydrogen production module 32 is controlled to be the maximum electrolytic power $P_{hmax}$ of the water electrolysis hydrogen production module 32, so that the operation of the superconducting liquid hydrogen refrigeration unit 24 is maintained. If the available power P satisfies that P is smaller than and equal to $P_{hmax}$ plus $P_{rmax}$ plus $P_y$ and P is larger than $P_{hmin}$ plus $P_{rmin}$ plus $P_y$, the mode enters the maximum power point tracking mode of the superconducting wind turbine generator: the offshore off-grid superconducting wind turbine generator 2 is controlled to track the high-power point to keep at the available power P, so that the output power $P_{wt}$ of the offshore off-grid superconducting wind turbine generator 2 satisfies that Pt is equal to P, and the value of the power $P_h$ of the water electrolysis hydrogen production module 32 is controlled to be equal to $P_{wt}$ minus $P_r$ minus $P_y$, so that the operation of the superconducting liquid hydrogen refrigeration unit 24 is maintained. If the available power P satisfies that P is smaller than or equal to $P_{hmin}$ plus $P_{rmin}$ plus $P_y$ and P is larger than $P_{rmin}$, the mode enters the wind power limitation and superconducting refrigeration maintaining mode: the output power $P_{wt}$ of the offshore off-grid superconducting wind turbine generator 2 satisfies that $P_{wt}$ is equal to $P_r$ by limiting the power of the offshore off-grid superconducting wind turbine generator 2 through pitch control, and the value of the power $P_h$ of the water electrolysis hydrogen production module 32 is controlled to be equal to 0, so that the operation of the superconducting liquid hydrogen refrigeration unit 24 is maintained. If the available power P satisfies that P is smaller than or equal to $P_{rmin}$, the mode enters the standby power generation and superconducting refrigeration maintaining mode: the standby power module 6 is started to produce power, and the output power $P_g$ of the standby power module 6 is equal to $P_r$ minus $P_{wt}$, and the value of the power $P_h$ of the water electrolysis hydrogen production module 32 is controlled to be equal to 0, so that the operation of the superconducting liquid hydrogen refrigeration unit 24 is maintained. The maximum refrigeration power $P_{rmax}$ and the minimum refrigeration power $P_{rmin}$ are the equipment parameters of the superconducting liquid hydrogen refrigeration unit 24. The maximum electrolysis power $P_{hmax}$ and the minimum electrolysis power $P_{rmin}$ are the equipment parameters of the water electrolysis hydrogen production module 32. $P_y$ is the sum of the power of other equipment (including the required power consumption of the seawater desalination component 31, the hydrogen liquefaction unit 4 and the liquid hydrogen storage unit 5). All the power can be obtained through calibration. It can be seen that the control unit 7 can schedule the output power Pt of the offshore off-grid superconducting wind turbine generator 2, the power $P_h$ of the water electrolysis hydrogen production module 32 and the output power $P_g$ of the standby power module 6 under various working conditions, so that the stable operation of the superconducting liquid hydrogen refrigeration unit 24 can be ensured, and the "quench" phenomenon and liquid hydrogen gasification are prevented from damaging the structure of the offshore off-grid superconducting wind turbine generator 2. In addition, "hydrogen liquefaction" in FIG. 8 shows the linked operation control mode of the hydrogen liquefaction unit 4 and the water electrolysis hydrogen production module 32, that is, when the value of the power $P_h$ of the water electrolysis hydrogen production module 32 is controlled to be equal to 0, the hydrogen liquefaction unit 4 also can stop running, so that the operation of the superconducting liquid hydrogen refrigeration unit 24 is further preferentially guaranteed under severe working conditions. It should be noted that the flow as shown in FIG. 8 is an implementation example of the four modes. Undoubtedly, based on the judgment conditions of the four modes, more judgment modes can be derived according to whether "else" is adopted or not, so description is not shown here in detail.

Embodiment II

This embodiment is basically the same as the first embodiment, and the main difference lies in that considering the characteristic that hydrogen can be easily obtained in the first embodiment, the backup power module 6 in the embodiment is a hydrogen fuel cell, and the hydrogen input end of the hydrogen fuel cell is connected with the output end of the hydrogen liquefaction unit 4 or the output end of the liquid hydrogen storage unit 5 to use hydrogen as the fuel of the hydrogen fuel cell. When wind power cannot run, the stored fuel cell uses the liquid hydrogen stored in the liquid hydrogen storage unit 5 to provide necessary power for key equipment, so that the continuous working capacity of the seawater electrolysis unit 3 and the hydrogen liquefaction unit 4 is improved, and enough energy is provided for restart and recovery of the equipment.

The above mentioned is just the preferable embodiments of the present disclosure, the scope of protection of the present disclosure is not limited to the above embodiments, and the technical scheme in basically same means belongs to the scope of protection in the present disclosure. It should be noted that for those of ordinary skill in the art, several improvements and modifications may further be made without departing from the principle of the present disclosure.

What is claimed is:

1. A device for manufacturing liquid hydrogen by offshore off-grid superconducting wind turbine, comprising:
    a liquid preparation platform (1), used as a supporting platform;
    an offshore off-grid superconducting wind turbine generator (2), used for wind power generation;
    a seawater electrolysis unit (3), used for electrolyzing seawater to obtain hydrogen;
    a hydrogen liquefaction unit (4), used for liquefying the hydrogen into liquid hydrogen;
    a liquid hydrogen storage unit (5), used for storing the prepared liquid hydrogen;
    a standby power module (6); and
    a control unit (7),
    wherein the seawater electrolysis unit (3), the hydrogen liquefaction unit (4) and the liquid hydrogen storage unit (5) are connected in sequence and respectively arranged on the liquid preparation platform (1); power ends of the seawater electrolysis unit (3) and the hydrogen liquefaction unit (4) are connected with a power output end of the offshore off-grid superconducting wind turbine generator (2); and an output end of the hydrogen liquefaction unit (4) or an output end of the liquid hydrogen storage unit (5) is connected with a coolant input port of the offshore off-grid superconducting wind turbine generator (2) to output the liquid hydrogen as a refrigerant of the offshore off-grid superconducting wind turbine generator (2),
    wherein the seawater electrolysis unit (3) comprises a seawater desalination component (31) and a water electrolysis hydrogen production module (32) which are connected with each other,
    wherein the seawater desalination component (31) comprises a seawater pump (311), a multistage filtration component (312), a booster pump (313) and a reverse osmosis filtration component (314) which are connected in sequence, an output end of the reverse osmosis filtration component (314) comprises a fresh water outlet and a brine outlet, and the seawater pump (311) and booster pump (313) are connected with the power output end of the offshore off-grid superconducting wind turbine generator (2),
    wherein the water electrolysis hydrogen production module (32) comprises a PEM electrolytic bath (321) and an AC-DC converter (322), the PEM electrolytic bath (321) comprises an anode plate (323) and a cathode plate (324) which are arranged in a gap, an anode diffusion layer (325), a proton exchange membrane (326) and a cathode diffusion layer (327) are sequentially arranged between the anode plate (323) and the cathode plate (324) in a gap, a surface of a side, close to the anode diffusion layer (325), of the proton exchange membrane (326) is provided with an anode catalyst layer (328), a surface of a side, close to the cathode diffusion layer (327), of the proton exchange membrane (326) is provided with a cathode catalyst layer (329), an AC side of the AC-DC converter (322) is connected with the power output end of the offshore off-grid superconducting wind turbine generator (2), and a DC side of the AC-DC converter (322) is connected with the anode plate (323) and the cathode plate (324),
    wherein the hydrogen liquefaction unit (4) comprises: a hydrogen-helium heat exchanger (42), used for hydrogen-helium heat exchange so as to realize hydrogen liquidation; a helium refrigeration module (43), used for using helium as a refrigerant to provide helium refrigeration for hydrogen-helium heat exchange; a hydrogen liquefaction module (44),
    wherein the hydrogen liquefaction module (44) is interconnected with a hydrogen transmission channel in the hydrogen-helium heat exchanger (42); the helium refrigeration module (43) is interconnected with a helium transmission channel in the hydrogen-helium heat exchanger (42); and a liquid hydrogen output port of the hydrogen liquefaction module (44) is connected with the liquid hydrogen storage unit (5),
    wherein the helium refrigeration module (43) comprises a helium compressor (431), a primary helium heat exchanger (432), a liquid nitrogen precooler (433), a secondary helium heat exchanger (434) and a helium expander (435), an output end of the helium compressor (431) is connected with an inlet of the helium transmission channel of the hydrogen-helium heat exchanger (42) through a first heat exchange channel of the primary helium heat exchanger (432), a first precooling channel of the liquid nitrogen precooler (433), a second heat exchange channel of the secondary helium heat exchanger (434), and the helium expander (435) in sequence, and an outlet of the helium transmission channel of the hydrogen-helium heat exchanger (42) is connected with a helium inlet of the helium compressor (431) through a third heat exchange channel of the secondary helium heat exchanger (434) and a fourth heat exchange channel of the primary helium heat exchanger (432); the hydrogen liquefaction module (44) comprises a hydrogen compressor (441), a primary hydrogen heat exchanger (442), a secondary hydrogen heat exchanger (443), a throttle valve (444) and a gas-liquid separator (445), an output end of the water electrolysis hydrogen production module (32) passes through the hydrogen compressor (441), a fifth heat exchange channel of the primary hydrogen heat exchanger (442), a second precooling channel of the liquid nitrogen precooler (433), a sixth heat exchange channel of the secondary hydrogen heat exchanger (443), the hydrogen transmission channel of the hydrogen-helium heat exchanger (42), and the throttle valve (444) in sequence to enter the gas-liquid separator (445), a top of the gas-liquid separator (445) is provided with a hydrogen outlet, the hydrogen outlet is connected with a hydrogen inlet of the hydrogen compressor (441) after passing through a seventh heat exchange channel of the secondary hydrogen heat exchanger (443) and an eighth heat exchange channel of the primary hydrogen heat exchanger (442) in sequence, and a liquid hydrogen output port of the gas-liquid separator (445) is connected with the liquid hydrogen storage unit (5), wherein the liquid hydrogen storage unit (5) comprises a liquid hydrogen storage tank which is composed of an outer shell (51) and an inner container (52) and of a double-layer structure, a vacuum or thermal insulation material layer (53) is arranged between the outer shell (51) and the inner container (52), and the liquid hydrogen storage tank is respectively provided with a liquid hydrogen filling port (54), a liquid hydrogen discharge port (55), and a hydrogen discharge port (56), wherein the offshore off-grid superconducting wind turbine generator (2) comprises a superconducting generator (21), a converter (22) and a transformer (23) which are connected in sequence, the superconducting generator (21) is connected with a superconducting liquid hydrogen refrigeration unit (24) for cooling a superconductor in the superconducting generator (21), and the output end of the hydrogen liquefaction unit (4) or an input end of the liquid hydrogen storage unit (5) is connected with a coolant input port of the superconducting liquid hydrogen refrigeration unit (24) to output the liquid hydrogen as the refrigerant of the offshore off-grid superconducting wind turbine generator (2), wherein the superconducting liquid hydrogen refrigeration unit (24) comprises a hydrogen storage cold box (241), a low-temperature circulating pump (242), a refrigerator (243) and a heat exchanger (244), the hydrogen storage cold box (241) is provided with the coolant input port of the superconducting liquid hydrogen refrigeration unit (24) for inputting the liquid hydrogen, the low-temperature circulating pump (242), the refrigerator (243) and the heat exchanger (244) are connected end to end to form a liquid hydrogen flow circuit, and a liquid hydrogen output end of the hydrogen storage cold box (241) is connected with the liquid hydrogen flow circuit for supplying the liquid hydrogen for the liquid hydrogen flow circuit, wherein an output end of the standby power module (6) is respectively connected with the power ends of the seawater electrolysis unit (3) and the hydrogen liquefaction unit (4); the standby power module (6) is a storage battery; and the storage battery is connected with the power output end of the offshore off-grid superconducting wind turbine generator (2) for charging; or the standby power module (6) is a hydrogen fuel cell; and a hydrogen input end of the hydrogen fuel cell is connected with the output end of the hydrogen liquefaction unit (4) or an input end of the liquid hydrogen storage unit (5) to use hydrogen as a fuel of the hydrogen fuel cell, wherein the offshore off-grid superconducting wind turbine generator (2) further comprises a wind speed sensor connected with the control unit (7), so that the control unit (7) is capable of obtaining a current available power P according to a wind speed sensed by the wind speed sensor; an output end of the transformer (23) is provided with a voltage transformer and a current transformer to detect an output power $P_{wt}$ of the offshore off-grid superconducting wind turbine generator (2); the offshore off-grid superconducting wind turbine generator (2) is provided with a pitch control mechanism connected with the control unit (7), for controlling a rotation speed of a blade of the superconducting generator (21) to adjust the output power $P_{wt}$ of the offshore off-grid superconducting wind turbine generator (2); a control end of the refrigerator (243) is connected with the control unit (7) for adjusting a refrigeration power $P_r$ of the superconducting liquid hydrogen refrigeration unit (24); a control end of the AC-DC converter (322) is connected with the control unit (7) for adjusting a electrolysis power $P_h$ of the water electrolysis hydrogen production module (32); a control end of the standby power module (6) is connected with the control unit (7) for adjusting an output power $P_g$ of the standby power module (6), wherein the control unit (7) is configured to schedule the output power $P_{wt}$ of the offshore off-grid superconducting wind turbine generator (2), the electrolysis power $P_h$ of the water electrolysis hydrogen production module (32), and the output power $P_g$ of the standby power module (6) in various modes as follows, to ensure a stable operation of the superconducting liquid hydrogen refrigeration unit (24):

if $P > P_{hmax} + P_{rmax} + P_y$, then the output power $P_{wt}$ of the offshore off-grid superconducting wind turbine generator (2) is limited by controlling the rotation speed of the blade of the superconducting generator (21), so that $P_{wt} = P_{hmax} + P_{rmax} + P_y$, and the water electrolysis hydrogen production module (32) is controlled to operate in a maximum electrolytic power $P_{hmax}$ of the water electrolysis hydrogen production module (32);

if $P_{hmin} + P_{rmin} + P_y < P \leq P_{hmax} + P_{rmax} + P_y$, then the output power $P_{wt}$ of the offshore off-grid superconducting wind turbine generator (2) is limited by controlling the rotation speed of the blade of the superconducting generator (21), so that $P_{wt} = P$, and the electrolysis power $P_h$ of the water electrolysis hydrogen production module (32) is controlled to be equal to $P_{wt} - P_r - P_y$;

if $P_{rmin} < P \leq P_{hmin} + P_{rmin} + P_y$, then the output power $P_{wt}$ of the offshore off-grid superconducting wind turbine generator (2) is limited by controlling the rotation speed of the blade of the superconducting generator (21), so that $P_{wt} = P_r$, and the electrolysis power $P_h$ of the water electrolysis hydrogen production module (32) is controlled to be equal to 0;

if $P \leq P_{rmin}$, then the standby power module (6) is started to produce power and the output power $P_g$ of the standby power module (6) is controlled to be equal to $P_r - P_{wt}$, and the electrolysis power $P_h$ of the water electrolysis hydrogen production module (32) is controlled to be equal to 0, wherein $P_{rmax}$ is a maximum refrigeration power of the superconducting liquid hydrogen refrigeration unit (24), $P_{rmin}$ is a minimum refrigeration power of the superconducting liquid hydrogen refrigeration unit (24) and $P_{rmax}$ and $P_{rmin}$ are equipment parameters of the superconducting liquid hydrogen refrigeration unit (24); $P_{hmax}$ is a maximum electrolysis power of the water electrolysis hydrogen production module (32), $P_{hmin}$ is a minimum electrolysis power of the water electrolysis hydrogen production module (32), and $P_{hmax}$ and $P_{hmin}$ are equipment parameters of the water electrolysis hydrogen production module (32); and $P_y$ is required total power consumption of the seawater desalination component (31), the hydrogen liquefaction unit (4) and the liquid hydrogen storage unit (5).

\* \* \* \* \*